United States Patent [19]
Parini

[11] Patent Number: 6,129,077
[45] Date of Patent: Oct. 10, 2000

[54] CUTTING TOOL AND METHOD FOR THE MANUFACTURE THEREOF

[75] Inventor: Giorgio Parini, Verona, Italy

[73] Assignee: Tecno Sinter S.r.l., Castelnuovo Del Garda, Italy

[21] Appl. No.: 09/203,486

[22] Filed: Dec. 2, 1998

[30] Foreign Application Priority Data

Dec. 4, 1997 [IT] Italy .................................. VR97A0116

[51] Int. Cl.$^7$ ........................................... B28D 1/04
[52] U.S. Cl. .......................... 125/15; 451/546; 451/542
[58] Field of Search .................................. 125/15, 13.01, 125/22; 451/541, 542, 543, 544, 546, 547

[56] References Cited

U.S. PATENT DOCUMENTS

| | | | |
|---|---|---|---|
| 4,718,398 | 1/1988 | Hallez | 125/15 |
| 4,962,748 | 10/1990 | Schweickhardt | 125/13.01 |
| 5,408,983 | 4/1995 | Sawluk | 125/15 |
| 5,465,706 | 11/1995 | Sawluk | 125/15 |
| 5,537,987 | 7/1996 | Okawauchi | 125/15 |
| 5,697,359 | 12/1997 | Okanishi et al. | 125/15 |
| 5,876,274 | 3/1999 | Hariu | 451/547 |

Primary Examiner—Timothy V. Eley
Assistant Examiner—Dung Van Nguyen
Attorney, Agent, or Firm—Browdy and Neimark P.L.L.C.

[57] ABSTRACT

The present invention relates to a cutting tool and to the method for manufacture thereof. Structurally, the cutting tool (1) in question is provided with an abrasive peripheral surface (2) arranged on the outside of a rigid central core (3) made of a high-rigidity composite material (carbon fibers, glass fibers, synthetic material fibers, carbon fibers bonded with high molecular-weight polymer filaments, carbon fibers bonded with kevlar fibers, sintered carbon) designed to ensure the rigidity of the cutting tool (1) and limit the transmission and amplification of sound waves across the central core (3). The abrasive peripheral surface (2) is preferably formed on a cutting element (5) fixed to an external support (6) rigidly connected to the central core (3) by means of fixing means (7). The method for manufacture of the cutting tool (1) in question substantially comprises the following processing steps:—formation of the abrasive peripheral surface (2) on the cutting element (5) fixed to the external support (6); seating of the fixing means on the external support (6); formation of the central core (3) using a high-rigidity composite material.

19 Claims, 5 Drawing Sheets

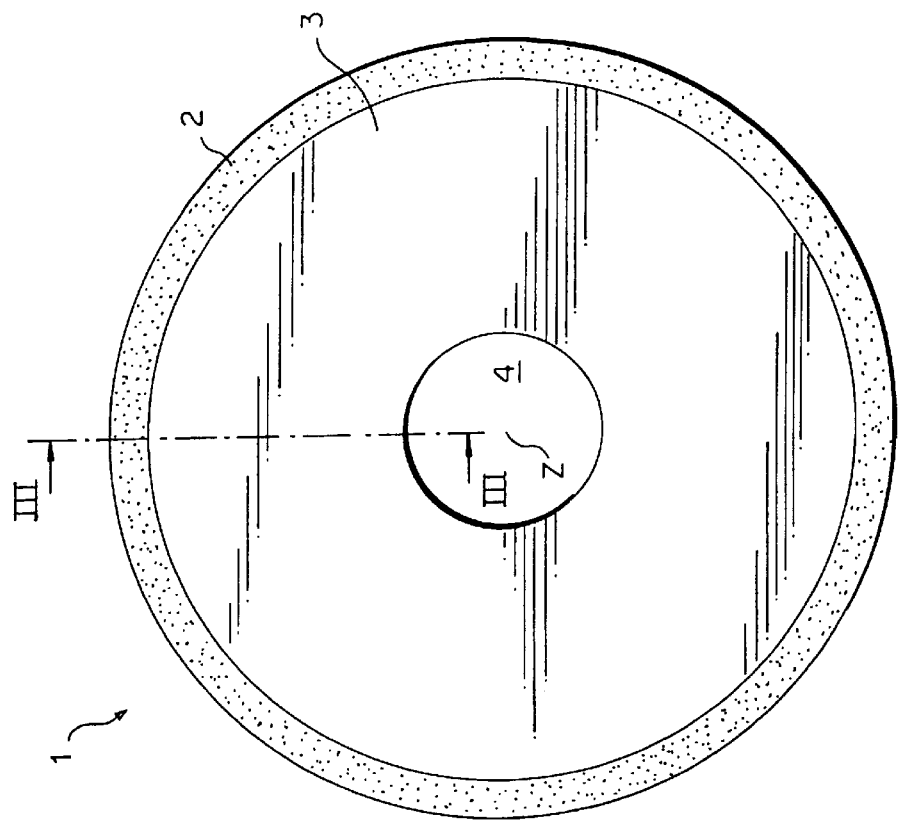
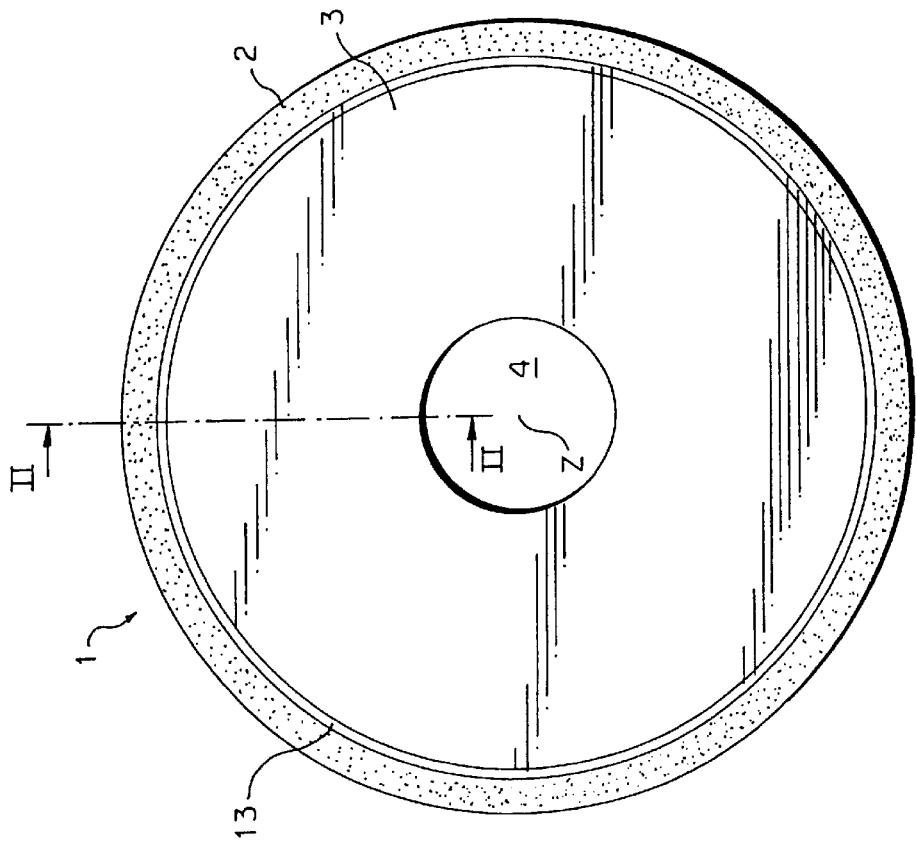

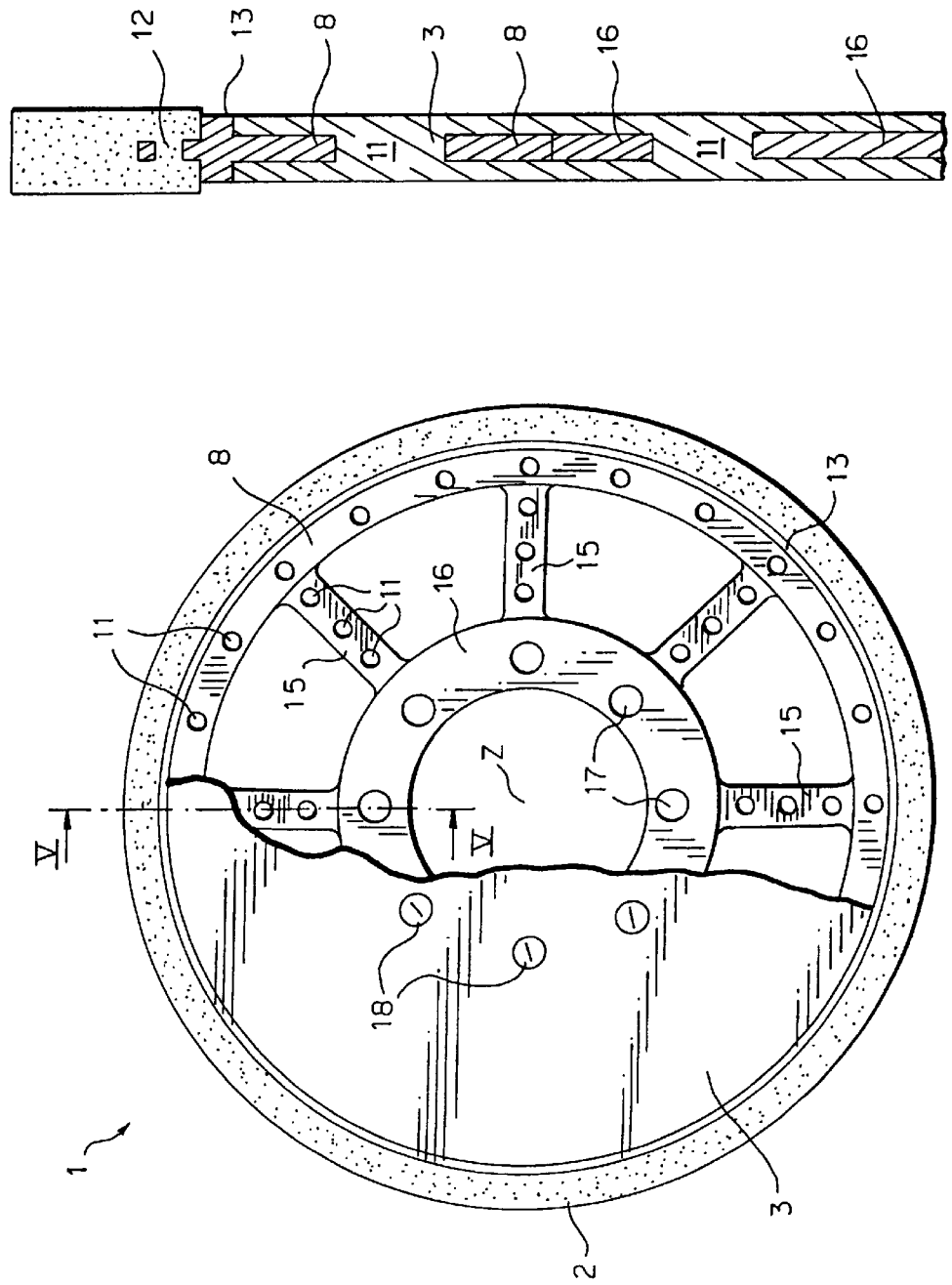

CUTTING TOOL AND METHOD FOR THE MANUFACTURE THEREOF

BACKGROUND OF THE INVENTION

1. Field of the Invention

The present invention relates to a cutting tool and to the method for manufacture thereof.

In particular, the tool in question may be advantageously used on fixed or portable power-driven machinery (electric tools) for cutting glass, wood, brick in general, ceramics, granite and reinforced concrete, or may be used as a grinding wheel for the machining of natural and precious stones, glass, crystal, metals, etc.

2. Description of the Prior Art

As is known, at present cutting tools generally consist of a metal plate-like core in the shape of a disk carrying peripherally abrasive means fixed onto the core or connected thereto by means of sintering or electrodeposition processes.

Commonly the abrasive means consist of a diamond-coated continuous rim or a plurality of diamond-coated circular segments which can be both obtained by means of known industrial methods such as sintering with diamond-coated metal powders, electrodeposition, setting of natural or artificial diamonds (super abrasives), rolling of diamond-coated elements on metal surfaces or also knurling of metal surfaces followed by pressing of diamond-coated elements.

The cutting tools may or may not also have, depending on the specific use for which they are intended, grooves arranged on the abrasive rim and designed to allow conveying away of the removed material.

During use, the cutting tools manufactured in accordance with the known art have certain drawbacks.

Firstly, the metal core with which they are formed may be subject, during operation, to flexural deformations which may result in an insufficient cutting (or grinding) precision or even breakage of the tool.

In particular, it should be noted that this problem tends to become more serious with heating of the tool.

An insufficiently rigid behavior of the internal core, in particular when made worse by the increase in the working temperature of the tool, also causes a reduction in the cutting (or grinding) efficiency caused by rubbing of the sides of the tool against the material to be cut (or ground) and therefore ultimately an increase in the power used for the same surface area cut (or ground).

A further drawback of no less importance consists in the excessive noisiness resulting from the use of cutting tools of the known type.

In fact, the metal core forms an excellent means for propagation and amplification of the vibrations and the sound waves which arise following rubbing contact between the abrasive surface and the material to be cut (or ground).

In other words, the cutting tools available hitherto in accordance with the known art emit, during the cutting (or grinding) operations and as a result of the presence of the core made of metallic material, sound waves at a noise level which is very troublesome, if not on occasions dangerous, for the health itself of the operators.

In order to be able to use the cutting tools of the known type in acceptable working conditions and in accordance with the existing regulations for safety in working environments, ear-muffs able to dampen the noise produced by the tools must be used.

It is obvious, moreover, that a working environment which is subject to deafening noise levels also gives rise to a whole series of indirect problems (such as the difficulty of communication between personnel) which affect the performance and the efficiency of a company.

SUMMARY OF THE INVENTION

The main object of the present invention is therefore that of eliminating the drawbacks associated with the cutting tools of the known type, by providing a cutting tool which has a high rigidity under any conditions of use and is able to achieve a constantly high standard of cutting (or grinding) quality.

A further object of the present invention is that of providing a cutting tool capable of producing, during the cutting (or grinding) operations performed on any material, a sound intensity level which is not excessively troublesome and totally safe.

Another object of the present invention is that of providing a method for obtaining the cutting tool in question, ensuring a perfect union between an external support provided with an abrasive surface and a central core connected to driving means.

BRIEF DESCRIPTION OF THE DRAWINGS

The technical characteristics of the cutting tool and the method for the manufacture thereof, in accordance with the abovementioned objects, may be clearly understood from the contents of the claims indicated below and the advantages thereof will emerge clearly from the detailed description which follows, provided with reference to the accompanying drawings, which show some purely exemplary and non-limiting examples of embodiment thereof, in which:

FIG. 1a shows schematically a plan view of a first example of embodiment of the cutting tool according to the present invention;

FIG. 1b shows schematically a plan view of a second example of embodiment of the cutting tool according to the present invention;

FIG. 2 shows schematically an enlarged laterally sectioned view, along the line II—II of FIG. 1a, of a portion of the tool according to FIG. 1a;

FIG. 4 shows schematically a plan view of the cutting tool according to the present invention in accordance with a third example of embodiment thereof and with some parts removed so that others may be seen more clearly;

FIG. 5 shows schematically an enlarged laterally sectioned view, along the line V—V of FIG. 4, of a portion of the tool according to FIG. 4;

DETAILED DESCRIPTION OF THE PREFERRED EMBODIMENTS

Figure 2:
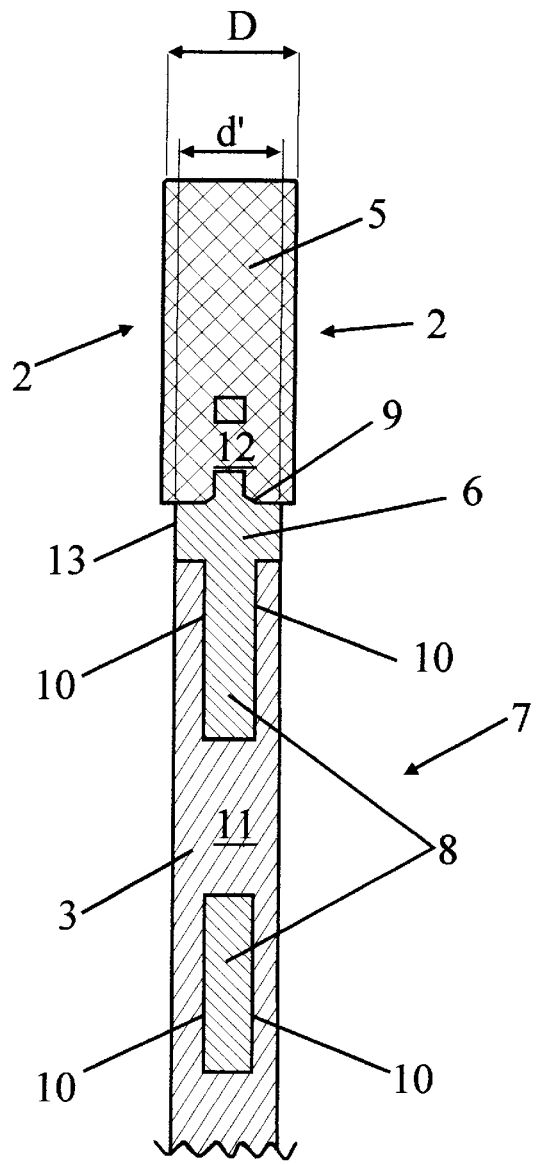

In accordance with the figures of the accompanying drawings, 1 denotes in its entirety the cutting tool according to the present invention.

For the sake of simplicity, reference will be made below to a cutting tool which can be used for the cutting of glass, wood, brick in general, ceramics, etc., it being understood that what is stated below may also refer equally well to a tool for grinding natural and precious stones, glass, crystal, metals, etc.

Therefore, the expression "cutting tool" is understood as referring to a disk provided with a peripheral abrasive surface which can be used to cut or grind material depending on the dimensions and the type of abrasive surface.

Said cutting tool has substantially the shape of a disk formed by means of an abrasive peripheral surface 2 mounted on the outside of a rigid central core 3 (see FIGS. 1a, 1b).

The core 3 has, formed centrally in it, a mounting hole 4 of conventional dimensions, suitable for allowing mounting of the tool 1 on driving means (not shown in the accompanying figures) capable of causing rotation thereof about its central axis Z.

The central core 3 is made, in accordance with an important characteristic feature of the present invention, of a high-rigidity composite material designed to ensure the rigidity of the cutting tool 1 and limit the transmission and amplification of sound waves across the central core 3, that is, sound dampening material.

In the case of the example illustrated in FIGS. 1a and 1b, it has been attempted to reproduce graphically central cores 3 consisting of carbon fibers (shown in black) bonded with polymer filaments of high molecular weight such as kevlar fibers ([1]) (shown in white). The central core may also be made from other composite materials without thereby departing from the protective scope of the present patent.

[1] Registered Trademark

In particular, the following have proved to be particularly suitable for this purpose: carbon fibers, kevlar fibers, glass fibers, synthetic material fibers, plastic materials enriched with extremely hard substances (silicates), sheets of carbon fibers arranged alternately with glass fibers or also sintered carbon.

Obviously the general technical characteristics of the industrial methods designed to produce the abovementioned materials are all known.

It should be noted that, advantageously, the use of glass fiber inside sheets of carbon fibers allows the formation of central cores 3 which have a high rigidity, resulting in savings in terms of the quantity of carbon fiber used. This is substantially an advantage because it allows a reduction in the production costs of the cutting tools 1 in question since glass fibers are less costly than carbon fibers.

Figure 3:
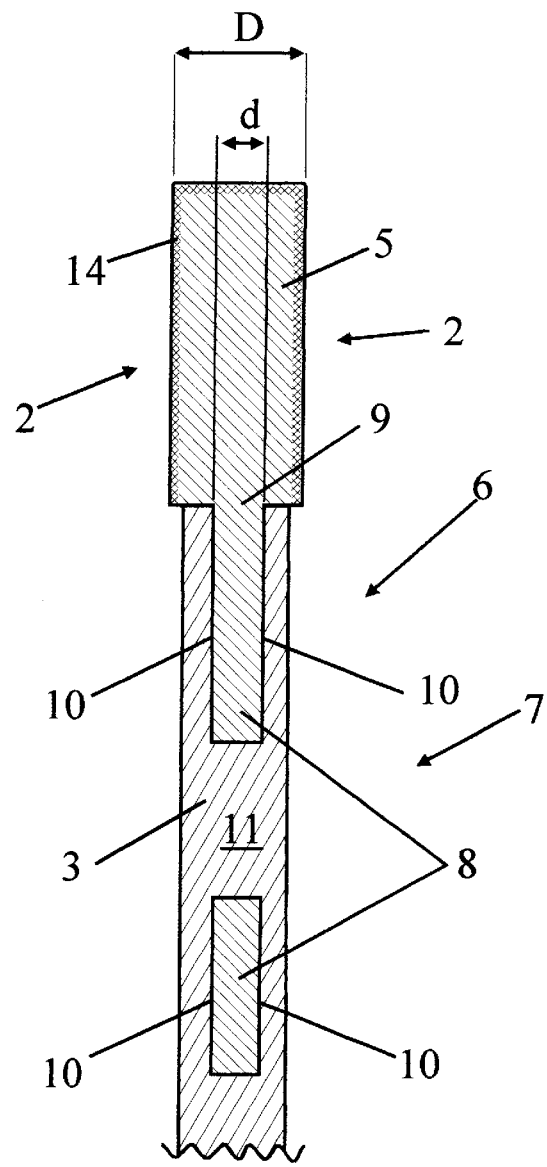
FIG. 3 shows schematically an enlarged laterally sectioned view, along the line III—III of FIG. 1b, of a portion of the tool according to FIG. 1b.

As can be seen in FIGS. 2 and 3 relating to two different examples of embodiment of the tool 1 in question, the abrasive peripheral surface 2 is formed on a cutting element 5 fixed to an external support 6 rigidly connected to the central core 3 by means of fixing means 7 which make the abrasive peripheral surface 2 integral with the central core 3 itself.

More in detail, the external support 6 comprises a connecting element 8 extending towards the mounting hole 4 and rigidly connected to the cutting element 5 along its outer edge 9.

In both the examples of embodiment illustrated (see FIGS. 2 and 3), the connecting element 8 has a transverse thickness d less than that of the cutting element D so as to allow the removal of swarf during the cutting operations.

The fixing means 7 mentioned above consist of the corrugated side surfaces 10 of the connecting element 8 which grip the central core 3 and a plurality of cavities 11 inside which the central core 3 itself is sealingly inserted in a complementary manner.

In particular, FIG. 2 shows the cross-section of a tool 1 in which the cutting element 5 is obtained by means of sintering of diamond-coated metal powders and is fixed during this process to the connecting element 8 by means of a plurality of securing holes 12 through which the sintering material passes.

A similar connection between the cutting element 5 and the connecting element 8 is also envisaged for the examples shown in FIGS. 4, 5, 8 and 9, which will be described further below.

It should be noted that, in the aforementioned examples provided with such a connection, the external support 6 has a shoulder 13 which is arranged between the cutting element 5 and the connecting element 8 and has a transverse thickness d' less than that of the cutting element 5. Therefore the external support 6 consists of the connecting element 8 and the shoulder 13.

In the example shown in FIG. 3, reference is made to the case where abrasive peripheral surfaces 2 have been formed on the cutting element 5 by means of an electrodeposition process.

In accordance with the known art, this process provides the cutting element 5 with a diamond coated-layer 14 along all the abrasive peripheral surfaces 2.

In this case, the cutting element 5 forms a single body with the connecting element 8 and forms therewith the abovementioned external support 6.

Advantageously, in both the examples mentioned, the cavities 11 may be formed by through-holes across which the central core 3 passes so as to fix the latter rigidly to the connecting element 8.

In accordance with the examples illustrated in the accompanying figures, the central core 3 extends on both sides of the cutting tool 1, covering the entire area between the outer edge 9 of the connecting element 8 and the mounting hole 4.

FIGS. 4 and 5 show another example of embodiment of the cutting tool 1 according to the present invention. In accordance with these figures, the connecting element 8 extends towards the inside of the central core 3 by means of a plurality of spokes 15 connected to one another at the inner end by a central rim 16.

On the latter it is possible to note the presence of threaded seats 17 designed to receive screws 18 inserted into corresponding holes formed on the central core 3. This is again intended to ensure a perfect union between the central core 3 and the connecting element 8.

In the particular case where there is a large number of spokes, the latter may be replaced by a single plate-like sheet extending continuously towards the mounting hole 4. Obviously, the abovementioned fixing means are in this case all formed on the surfaces of the aforementioned plate-like sheet.

According to a preferred embodiment, all the different elements from which the external support 6 may be formed (cutting element 5, shoulder 13, connecting element 8, spokes 15 and central rim 16) are made of metallic material.

Figure 7:
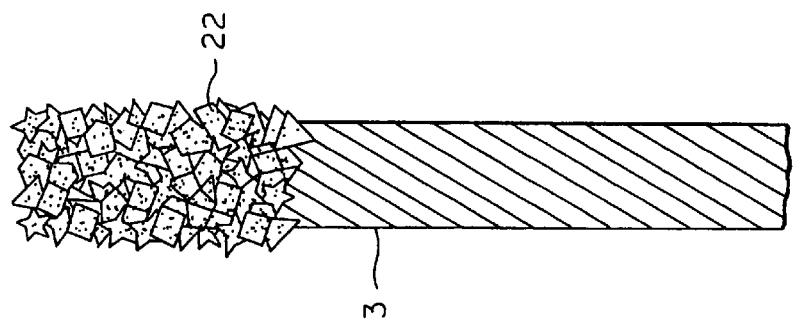
FIG. 7 shows schematically an enlarged laterally sectioned view, along the line VII—VII of FIG. 6, of a portion of the tool according to FIG. 6.
Figure 6:
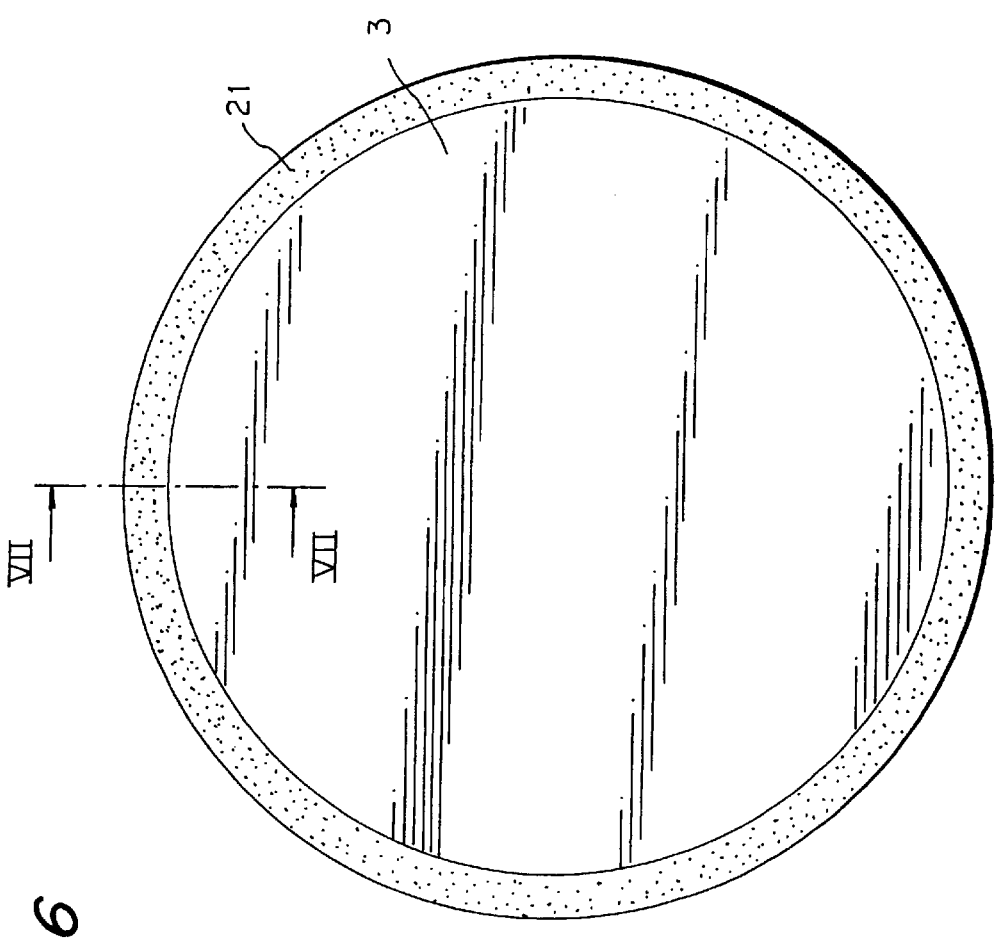
FIG. 6 shows schematically a plan view of the cutting tool according to the present invention in accordance with a fourth example of embodiment thereof.

FIGS. 6 and 7 show another example of embodiment of the tool according to the present invention. In accordance with this embodiment, the external support 6 is dispensed with and the abrasive peripheral surface 2 is formed directly on a peripheral portion 21 of the central core 3. In other words, diamond-coated elements 22 incorporated in a fixed manner in the web forming the central core 3 are present on the peripheral portion 21. This constructional form is made possible, for example, by pressing together with bonding agents several sheets of carbon fiber inside which, in the region of the peripheral portion 21, a mixture of diamond-coated elements 22 is deposited. The latter penetrate, following pressing, into the webbing of the carbon fiber, remaining bonded thereto and, projecting on the surface, form the abrasive peripheral surfaces 2.

Figure 9:
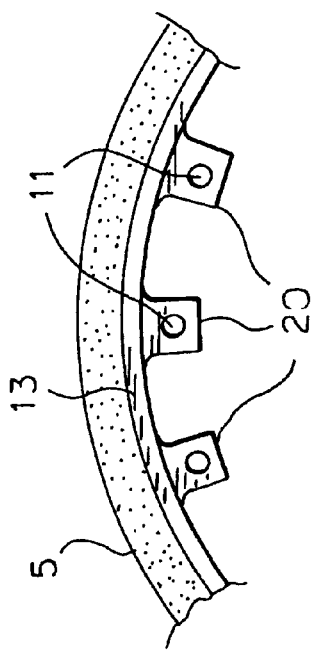
FIGS. 8 and 9 show two further possible configurations of a constructional detail of the tool in question, relating to an external support.
Figure 8:
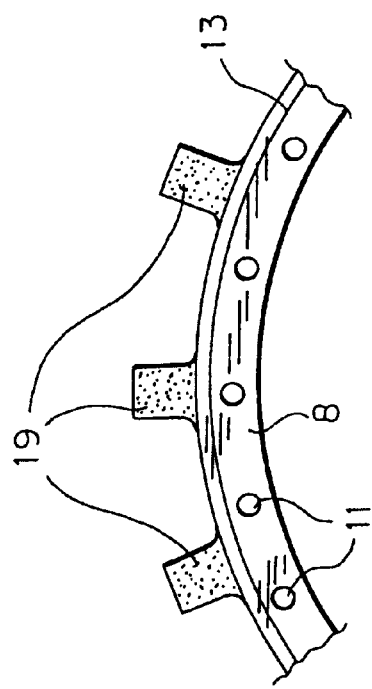

FIGS. 8 and 9 show two different examples of embodiment of the external support 6. In particular, the example according to FIG. 8 shows a plurality of circular cutting segments 19 fixed to a continuous rim. The example according to FIG. 9, on the other hand, shows a cutting element 5 consisting of a continuous rim fixed to a connecting element 5 consisting of a plurality of circular connecting segments 20.

The method of manufacture of the tool described structurally above is as follows:

Firstly, the abrasive peripheral surface 2 is formed on the cutting element 5 fixed to the external support 6. This step is made possible by means of known industrial methods such as sintering with diamond-coated metal powders, electrodeposition, setting of natural or artificial diamonds (super abrasives), rolling of diamond-coated elements on metallic surfaces or also knurling of metal surfaces following by pressing of diamond-coated elements.

The fixing means 7 are then seated on the external support 6, namely the corrugated side surfaces 10 and the plurality of cavities 11 are formed on the connecting element 8.

At this point, the step involving formation of the central core 3 is performed, said core, at the end of this same step, being rigidly connected to the external support 6 by means of the fixing means 7 mentioned above.

In the particular case where formation of the central core 3 is achieved by pressing sheets of carbon fibers (or carbon/kevlar fibers, kevlar fibers, glass fibers, carbon fibers/glass fibers), the material forming the central core 3 is inserted inside the cavities 11 of the connecting element 8 and said material is anchored to the rough zones of the corrugated surfaces 10 of the connecting element 8.

During the step of formation of the central core 3, the whole area between the outer edge 9 of the connecting element 8 and the mounting hole 4 is covered.

What is claimed is:

1. A substantially disc-shaped cutting tool having a central axis (Z) and a mounting hole (4); the tool comprising:
   (a) a support including
      a cutting portion (5) including at least one abrasive peripheral surface (2) disposed on an outside thereof, and,
      a connecting portion (8) fixed to said cutting portion and drivable to rotate the tool about the central axis, the connecting portion extending from said cutting portion to a central rim (16) surrounding the mounting hole; and
   (b) high rigidity sound-dampening material fixed on both sides of said connecting portion, said sound dampening material comprising a composite material selected from the group consisting of (1) carbon fibers bonded with high molecular weight polymer filaments, (2) carbon fibers bonded with kevlar fibers, (3) sintered carbon, and (4) laminated carbon fibers between which at least one sheet of glass fiber is inserted.

2. The tool as claimed in claim 1, wherein said sound-dampening material comprises of carbon fibers bonded with high molecular weight polymer filaments.

3. The tool as claimed in claim 1, wherein said sound-dampening material comprises of carbon fibers bonded with kevlar fibers.

4. The tool as claimed in claim 1, wherein said sound-dampening material comprises of sintered carbon.

5. The tool as claimed in claim 1, wherein said sound-dampening material comprises of laminated carbon fibers between which at least one sheet of glass fiber is inserted.

6. The tool according to claim 1, wherein said cutting portion comprises a separate cutting element, and said connecting portion comprises a separate cutting element, said cutting element being fixed to said connecting element.

7. The tool as claimed in claim 6, wherein said support (6) has a shoulder (13) which is arranged between said cutting element (5) and said connecting element (8) and has a transverse thickness (d') less than that (D) of said cutting element (5).

8. The tool as claimed in claim 6, wherein said cutting element (5) is made of metallic material.

9. The tool as claimed in claim 6, wherein said connecting element (8) is made of metallic material.

10. The tool as claimed in claim 6, wherein said cutting element (5) comprises a plurality of circular cutting segments (19).

11. The tool as claimed in claim 6, wherein said cutting element (5) comprises a circular rim.

12. The tool as claimed in claim 6, wherein said connecting element (8) comprises a plurality of circular connecting segments (20).

13. The tool as claimed in claim 6, wherein said connecting element (8) comprises a continuous rim.

14. The tool according to claim 1, wherein the connecting portion comprises metallic material.

15. The tool according to claim 1, wherein the connecting portion includes two flat side surfaces whereon the sound-dampening material is fixed.

16. The tool according to claim 15, wherein the connecting portion includes a plurality of spokes and gaps disposed between the spokes, the central rim, and the cutting portion.

17. The tool according to claim 16, comprising a plurality of cavities (11) inside which said sound-dampening material is inserted in a complementary manner.

18. The tool according to claim 17, wherein the cavities comprise through-holes and said sound-dampening material crosses from one of the sides to the other and substantially covers the connecting portion.

19. The tool according to claim 1, wherein the cutting portion is transversely thicker, along a direction parallel to the central axis, than the connecting portion, and wherein the connecting portion comprises corrugated side surfaces gripping said sound-dampening material.

* * * * *